(12) United States Patent
Kim et al.

(10) Patent No.: US 9,464,175 B2
(45) Date of Patent: Oct. 11, 2016

(54) MELT DEVOLATILIZATION EXTRUSION PROCESSS

(75) Inventors: Eung Kyu Kim, Midland, MI (US); Daniel A. Beaudoin, Midland, MI (US); Mark A. Barger, Midland, MI (US); Ronald B. Leng, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 190 days.

(21) Appl. No.: 14/240,861

(22) PCT Filed: Sep. 14, 2012

(86) PCT No.: PCT/US2012/055489
§ 371 (c)(1),
(2), (4) Date: Jul. 14, 2014

(87) PCT Pub. No.: WO2013/048785
PCT Pub. Date: Apr. 4, 2013

(65) Prior Publication Data
US 2014/0323644 A1 Oct. 30, 2014

Related U.S. Application Data

(60) Provisional application No. 61/539,939, filed on Sep. 27, 2011.

(51) Int. Cl.
| | |
|---|---|
| *C08F 6/10* | (2006.01) |
| *C08J 3/20* | (2006.01) |
| *C08C 2/02* | (2006.01) |
| *C08C 19/12* | (2006.01) |
| *C08L 23/28* | (2006.01) |
| *B29C 47/00* | (2006.01) |
| *C08F 6/00* | (2006.01) |
| *C08J 3/00* | (2006.01) |
| *C08L 15/02* | (2006.01) |

(52) U.S. Cl.
CPC ............. *C08J 3/20* (2013.01); *B29C 47/0016* (2013.01); *B29C 47/0023* (2013.01); *C08C 2/02* (2013.01); *C08C 19/12* (2013.01); *C08F 6/003* (2013.01); *C08F 6/10* (2013.01); *C08J 3/005* (2013.01); *C08L 15/02* (2013.01); *C08L 23/28* (2013.01); *C08J 2300/102* (2013.01); *C08J 2353/02* (2013.01); *C08J 2425/06* (2013.01)

(58) Field of Classification Search
CPC ........... C08L 23/28; C08C 19/12; C08F 6/10
USPC ....................................................... 524/525
See application file for complete search history.

(56) References Cited

U.S. PATENT DOCUMENTS

| | | | |
|---|---|---|---|
| 3,799,234 | A | 3/1974 | Skidmore |
| 6,833,096 | B2 | 12/2004 | Wang |
| 7,211,629 | B2 | 5/2007 | Chapman |
| 7,226,989 | B2 | 6/2007 | Silvi |
| 7,419,295 | B2 | 9/2008 | Inoue |
| 7,595,367 | B2 | 9/2009 | Carrillo |
| 7,605,194 | B2 | 10/2009 | Ferencz |
| 7,605,222 | B2 | 10/2009 | Ye |
| 2008/0139700 | A1 | 6/2008 | Roden |
| 2009/0076214 | A1 | 3/2009 | Kiss |
| 2009/0233097 | A1 | 9/2009 | Kolich |
| 2009/0264599 | A1 | 10/2009 | Balhoff |

FOREIGN PATENT DOCUMENTS

| | | |
|---|---|---|
| EP | 262594 A | 4/1988 |
| EP | 988957 A | 3/2000 |
| EP | 2014684 A | 1/2009 |
| WO | 95/01380 A | 1/1995 |
| WO | 2007/019120 A | 2/2007 |
| WO | 2008/008129 A | 1/2008 |
| WO | 2008/011477 A | 1/2008 |
| WO | 2009/036904 A | 11/2009 |
| WO | 2012/058002 A | 5/2012 |

*Primary Examiner* — Edward Cain
(74) *Attorney, Agent, or Firm* — Gary C Cohn PLLC

(57) ABSTRACT

Brominated organic polymer solutions from a bromination reaction are devolatilized in a devolatilizing extruder. A starting organic polymer is brominated in solution to form a brominated polymer solution. This solution is combined with a second thermoplastic polymer to form a concentrated solution. The solvent and other volatile compounds are removed from the concentrated solution in a devolatilizing extruder to form a devolatilized polymer blend.

19 Claims, No Drawings

MELT DEVOLATILIZATION EXTRUSION PROCESSS

The present invention relates to a method for brominating an organic polymer and devolatilizing the brominated polymer.

Brominated organic polymers are becoming of interest as flame retardants for polystyrene and other polymer systems. The brominated organic polymers can be produced by brominating a starting polymer in solution in various organic solvents as described, for example, in WO 2008/021417 and WO 2008/021418. The concentration of the polymer in the solvent is generally rather low; the ratio of brominated polymer weight to solvent weight is typically in the range of 5-25:95-75% by weight. This solvent must be removed from the product, together with volatile by-products of the bromination reaction and other volatile materials that may be present in the reaction solution. It is generally necessary to reduce the concentration of volatile compounds in the product to something less than 0.3% by weight (3,000 parts per million (ppm)).

Several approaches to accomplishing this have been suggested. The brominated polymer can be precipitated by the addition of an anti-solvent to the bromination reaction solution. Steam stripping methods can be used. The reaction solution can be sprayed into a heated non-solvent to simultaneously remove solvent and form small particles. Solvent can be removed by spraying the solution into a horizontal plowshare reactor.

The devolatilization must be performed carefully because the brominated polymer is temperature-sensitive. At high temperatures, the polymer loses bromine, typically in the form of HBr. HBr is corrosive to equipment and represents a worker exposure concern. The loss of HBr causes carbon-carbon double bonds to form in the polymer; these double bonds can react to cross-link the polymer, which can lead to gel formation. The problem is exacerbated because the evolved HBr catalyzes the further loss of bromine, so that once a little HBr begins to evolve, greater rates of debromination often are seen. And of course, the loss of bromine reduces the effectiveness of the brominated polymer as a flame retardant. Therefore, one must exercise careful control of the temperature at which the devolatilization is performed.

Another problem is that the viscosity of the brominated polymer increases very substantially as solvent is removed. The high viscosity makes the polymer difficult to handle and limits the types of processing methods that can be used. For example, various types of solvent flashing equipment, such as wiped film evaporators or falling film evaporators, can be used only to remove a small portion of the solvent, if at all. If too much solvent is removed in this equipment, the remaining highly viscous solution tends to coat the surfaces of the evaporator, where the brominated polymer becomes subjected to high temperatures and/or long residence times and degrades. In addition, the high viscosity of the concentrated solution causes residence times to be long and operating rates to be correspondingly slow. Thus, flashing equipment may be useful for performing a preliminary concentrating step, but cannot be used to produce the final devolatilized product.

Another approach is a devolatilization extrusion process. A devolatilization extrusion process has the potential to reduce the volatile content of an organic polymer to very low levels.

The devolatilization extrusion process is performed by heating the polymer enough to allow it to flow under the conditions that exist in the extruder. The temperature is held above the boiling temperature of the volatiles that are to be removed. This extruder includes an elongated chamber (typically referred to as the "extruder barrel") that has one or more vents and one or more rotating screws. Volatilized compounds escape from the extruder barrel through the vents as the polymer traverses along the length of the extruder barrel towards an outlet. The screw(s) provide the mechanical force necessary to force the heated polymer through and out of the extruder barrel.

A main limitation of devolatilization extrusion processes is the amount of solvent that can be removed. The process operates poorly when the initial solvent concentration is high. Highly dilute solutions often are not viscous enough to process easily through extrusion equipment. Also, the devolatilization of dilute solutions requires that a very large proportion of the starting mass be removed along the length of the extruder barrel, before the devolatilized polymer exits at the end of the barrel. This is difficult to achieve while maintaining good process control. Therefore, as described in WO 2012/058,002, a rather dilute reaction solution obtained from the bromination reaction must be concentrated before a final devolatilization step can be performed in an extruder. The need for multiple processing steps adds capital and operating costs. A simpler and less expensive process is wanted.

This invention is such a process for producing a devolatilized polymer blend. This process comprises a) brominating a starting organic polymer by reaction of the organic polymer with a brominating agent in solution to produce a brominated polymer solution that contains at least 65% by weight volatile compounds and not more than 35% by weight of the brominated organic polymer;

b) combining the brominated polymer solution with at least one second thermoplastic organic polymer to reduce the concentration of volatile compounds in the solution to at most 60% by weight, wherein the second thermoplastic organic polymer is substantially devoid of polymerizable carbon-carbon unsaturation and contains no more than 5% by weight of halogen, and c) separating the product obtained in step b) in a devolatilizing extruder to form a devolatilized polymer blend containing the brominated organic polymer, the second thermoplastic organic polymer, and not more than 3,000 ppm of volatile compounds, and a separate vapor phase containing separated volatile compounds; and discharging the vapor phase through at least one vent in the devolatilizing extruder barrel and discharging the devolatilized polymer blend from the devolatilizing extruder through an outlet downstream of the vent(s).

This process permits one to eliminate a preliminary solvent removal step prior to introducing the brominated polymer solution into the devolatilizing extruder, and therefore to eliminate the equipment and operating costs associated with such a step. The second thermoplastic polymer can be selected with the end-use application in mind. For example, if the brominated polymer is to be used as a flame retardant for a particular type of polymer, a polymer of that particular type can be combined with the brominated polymer solution in step b) of the process to reduce the solvent concentration. Doing this can have additional benefits as well, such as making the brominated polymer more readily dispersible into other polymers (and thus facilitating the production of flame-retardant polymer blends). In addition, the characteristics of the second thermoplastic organic polymer can be selected so that desirable conditions, especially moderate operating temperatures that allow the brominated organic polymer to be processed with minimal loss of bromine, can be maintained in the devolatilizing extruder. Yet another advantage of the invention is that it affords a convenient and inexpensive means for incorporating various other materials into the devolatilized polymer blend. Among such materials include thermal stabilizers, which not only can help prevent thermal degradation during the devolatilization extrusion step but remain in the devolatilized product and therefore can provide stabilization in subsequent downstream melt-processing operations as well. Other materials that can be incorporated into the devolatilized polymer blend in this process are described below.

The bromination step a) of this process can be performed in any convenient manner, provided that the bromination step produces a solution that contains at least 65% by weight volatile compound(s) and not more than 35% by weight of the brominated organic polymer. For purposes of this invention, "volatile compounds" are compounds having a boiling temperature of up to 130° C. at 1 atmosphere pressure. The volatile compounds include solvent(s) from the bromination reaction, and may in addition include water (if not the solvent) and various residual starting materials, by-products and/or impurities from the bromination reaction.

The brominated polymer solution preferably contains at least 70% or at least 75% by weight of volatile compound(s) and not more than 30% or not more than 25% by weight of the brominated organic polymer. The brominated polymer solution may contain as little as 5 weight percent of the brominated organic polymer, but preferably contains at least 10 weight percent thereof. In addition to the volatile compounds and the brominated organic polymer, the solution may contain various non-volatile materials, including, for example, by-products of the bromination reaction, residual brominating agents, and the like. These other non-volatile materials preferably constitute no more than 10% and more preferably no more than 5% of the total weight of the brominated polymer solution.

In some embodiments, the starting brominated polymer solution is a solution formed in a bromination reaction of a starting polymer that contains aliphatic carbon-carbon unsaturation, some of which are described more fully below. In the reaction, bromine is added across the aliphatic carbon-carbon unsaturation while the starting polymer is dissolved in a solvent. The bromination may be performed using a direct bromination process, in which the starting polymer is brominated with elemental bromine as described in WO 2008/021418. An aliphatic alcohol may be present during the bromination reaction, also as described in WO 2008/021418; this alcohol may also form a part of the volatile compounds present in the brominated polymer solution. Alternatively, the aliphatic bromine-containing polymer may be obtained by brominating the starting polymer with a quaternary ammonium tribromide or a quaternary phosphonium tribromide as described, for example, in WO 2008/021417 and WO 2010/021906. Residual brominating agent and other by-products can be removed from the brominated polymer solution, before the solution is taken to steps b) and c) of the inventive process. Extraction and washing methods can be used to accomplish this; some or all of the extractant and/or washing fluid may also form all or a part of the volatile compound(s) contained in the brominated polymer solution that is taken to steps b) and c).

The brominated polymer is a thermoplastic that contains at least 10% by weight bromine. The brominated polymer may contain at least 25% by weight bromine and may contain up to 75% by weight bromine. The bromine is preferably aliphatically bound bromine.

The neat brominated polymer preferably has a glass transition temperature of 220° C. or less, more preferably 180° C. or less, and still more preferably a glass transition temperature of 80 to 180° C. It preferably is a solid at 25° C. Its molecular weight is not considered to be critical to the invention. In general, the brominated polymer may have a weight average molecular weight ($M_w$), as measured by gel permeation chromatography against a polystyrene standard, of from 25,000 to 400,000 g/mol, preferably from 25,000 to 300,000 g/mol and more preferably from 50,000 to 200,000 g/mol. GPC molecular weight determinations, for purposes of this invention, can be performed using an Agilent 1100 series liquid chromatograph equipped with two Polymer Laboratories PLgel 5 micrometer Mixed-C columns connected in series and an Agilent G1362A refractive index detector, or equivalent device with tetrahydrofuran (THF) or other suitable solvent flowing at a rate of 1 mL/min and heated to a temperature of 35° C. as the eluent.

The brominated polymer may be a block copolymer, in which one or more of the blocks contains aliphatically bound bromine (and thus is more thermally sensitive), and in which one or more other blocks is substantially devoid of bromine (and thus is less thermally sensitive).

Examples of useful brominated polymers include those formed by brominating polymers and copolymers of a conjugated diene monomer (such as polymers and copolymers of butadiene and/or isoprene). Preferred among these are polymers formed by brominating random, graft or (preferably) block copolymers of a conjugated diene monomer such as butadiene or isoprene and a vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene as well as compounds that are substituted on the ethylenically unsaturated group (such as, for example alpha-methylstyrene), and/or are ring-substituted. Such a block copolymer may contain blocks of the polymerized conjugated diene monomer that, prior to bromination, constitute from 20 to 90% by weight of the block copolymer. Such a starting polymer may also contain repeating units formed by polymerizing monomers other than the conjugated diene monomer and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the vinyl aromatic monomer and/or the conjugated diene monomer, may be polymerized to form blocks, or may be grafted. The molecular weight of the conjugated diene monomer blocks may be from 10,000 to 150,000 prior to bromination. The block copolymer used as a starting material for the bromination step may be, for example, a diblock copolymer of butadiene and styrene or a triblock copolymer having a central polybutadiene block and outer polystyrene blocks.

Other examples of brominated polymers include those obtained by brominating (i) a polymer or copolymer of allylmaleimide, especially a copolymer thereof with styrene; (ii) an aliphatically unsaturated polyester; (iii) an allyl ether of a novolac resin, (iv) a ROMP polymer or copolymer or (v) a poly(4-vinyl phenol allyl ether). Some of these starting polymers are described in WO 2007/019120.

The solvent present in the brominated polymer solution may be any solvent in which the brominated organic polymer is soluble to the extent of at least 5 parts by weight per 95 parts by weight solvent, and which has a melting temperature of no greater than 20° C. and a boiling temperature (at 1 atmosphere pressure) of no greater than 130° C., preferably no greater than 125° C. The solvent in some cases may be or include water, but more typically will include one or more organic solvents. Among the organic solvents are hydrocarbons such as benzene, toluene, alkanes, cycloalkanes and the like; halogenated alkanes such as carbon tetrachloride, chloroform, dichloromethane, bromochloromethane, dibromomethane and 1,2-dichloroethane; various ether, aldehyde or ketone compounds, as well as other low molecular weight organic solvents. If a separate water phase is present at the end of the brominating reaction, it is generally preferred to remove that water phase from the brominated polymer solution before taking the brominated polymer solution to subsequent steps.

In step b) of the process, the brominated polymer solution is combined with one or more second thermoplastic polymers. The second thermoplastic organic polymer is substantially devoid of polymerizable carbon-carbon unsaturation and contains no more than 5%, preferably from 0 to 2%, by weight of aliphatically bound halogen. It preferably is compatible with the brominated organic polymer at the relative amounts thereof that are present. The brominated organic polymer and the second thermoplastic polymer are said to be "compatible" for purposes of this invention if, in the devolatilized polymer blend exiting the devolatilizing extruder, they form a co-continuous phase at the relative proportions thereof that are present, or else form a dispersion in which one of polymers is dispersed in the other with the dispersed phase having a volume average domain size of no greater than 25 microns. If the polymers form a dispersion, it is preferred that the brominated organic polymer represents the disperse phase, as this may reduce direct contact between the brominated organic polymer and hot extruder surfaces, thereby further reducing the thermal degradation of the brominated organic polymer. In general, the lower viscosity polymer (preferably the second thermoplastic polymer) will tend to form the continuous phase if a dispersion is formed.

The second thermoplastic polymer in some embodiments has a weight average molecular weight of from about 25,000 to about 175,000 g/mol as measured by GPC against a polystyrene standard. In specific embodiments, the weight average molecular weight may be from 25,000 to 150,000. In more specific embodiments, the weight average molecular weight is from 25,000 to 75,000.

The second thermoplastic polymer preferably has a glass transition temperature of at least 80° C. but 220° C. or less, preferably 200° C. or less, more preferably from about 80 to 180° C. or from 80 to 150° C.

The second thermoplastic polymer(s) preferably have a melt shear viscosity that is lower than that of the brominated organic polymer. The second thermoplastic polymer(s) preferably has a melt shear viscosity (as a neat resin) of less than 200 Pa·s at a shear rate of 100 s$^{-1}$ and a melt shear viscosity (again as a neat resin) of less than 100 Pa·s at a shear rate of 1000 s$^{-1}$ at 180° C.

The second thermoplastic polymer preferably is a polymer or copolymer of a vinyl aromatic monomer. An especially preferred second thermoplastic polymer is a homopolymer or copolymer of styrene. Useful polystyrene polymers are commercially available; these include, for example, Piccolastic™ D125, available from Eastman Chemicals.

Mixtures of two or more second thermoplastic polymers may be used.

Enough of the second thermoplastic polymer(s) is combined with the brominated polymer solution in step b) to reduce the content of volatile compound(s) to no greater than 60% and preferably no greater than 55% by weight.

After the combination step, the content of volatile compound(s) may be as low as 5% by weight but more preferably is at least 20% by weight and still more preferably at least 25% by weight. In addition, it is preferred to add in step b) at least 0.25 parts by weight, preferably at least 0.5 parts weight, but not more than 4 parts by weight, preferably not more than 2 parts by weight and still more preferably not more than 1.5 parts by weight of the second thermoplastic polymer per part by weight of the brominated organic polymer in the brominated polymer solution.

In some embodiments, the relative amounts of the brominated organic polymer and the second thermoplastic polymer are selected, together with the presence of any other non-volatile materials as may be present, such that the devolatilized polymer blend discharged from the devolatilizing extruder at the end of step c) has a melt shear viscosity of no greater than 500 Pa·s at a shear rate of 100 s$^{-1}$ and of no greater than 300 Pa·s at a shear rate of 1000 s$^{-1}$ at 180° C.

The method by which the brominated polymer solution is combined with the second thermoplastic polymer is not considered to be critical, provided that the concentration of volatile compound(s) in the resulting product is brought to 60% by weight or below as described before. The second thermoplastic polymer may be provided, for example, in the form of a particulate solid, as a melt or even as a solution in a solvent at the time it is combined with the brominated polymer solution. It is not necessary to dissolve the second thermoplastic polymer into the brominated polymer solution or otherwise form a single-phase mixture, although that may be done.

Therefore, in some embodiments, the second thermoplastic polymer is provided in the form of a particulate solid, which is combined with the brominated polymer solution. In this case, the combination step may be performed by simply mixing the materials together using any suitable mixing apparatus. The mixing apparatus may be operated batch-wise, or in semi-continuous or continuous mode. The mixing apparatus may include various types of mechanical and/or static mixing elements, and may or may not be provided with heating and/or cooling to control the temperature during the combination step. In some embodiments, the mixing apparatus is an extruder. It is possible to partially or entirely perform the combination step b) in the same devolatilizing extruder as used to separate the solvent in step c), by separately feeding the brominated polymer solution and some or all of the second thermoplastic polymer into the devolatilizing extruder.

The second thermoplastic polymer may become dissolved in the brominated polymer solution as a result of the combination step. During step b), the materials may be subjected to an elevated temperature to promote dissolution and/or melting of the second thermoplastic polymer, although this is not necessary. If the second thermoplastic polymer does not become dissolved or melted (or is only partially dissolved or melted), the product of step b) typically will be a dispersion or slurry of particles of the second thermoplastic polymer in the brominated polymer solution. If the second thermoplastic polymer becomes completely dissolved or melted, the product of step b) is generally a single- or (less preferably) multiphase liquid, although in some cases a solid single- or multiphase solution may be formed, especially if it is cooled.

In other embodiments, the second thermoplastic polymer is provided in the form of a melt or a liquid solution in a suitable solvent. The product of step b) in that case is typically a single or (less preferably) a multiphase liquid, or in some cases a solid single- or multiphase solution may form, especially upon cooling.

The product of step b) is separated in a devolatilizing extruder to form a devolatilized polymer blend and a separate vapor phase containing separated volatile compounds. The devolatilized polymer blend contains the brominated organic polymer, the second thermoplastic organic polymer, and not more than 3,000 ppm of volatile compounds.

For purposes of this invention, a "devolatilizing extruder" is an apparatus that contains an elongated chamber (the "extruder barrel") that includes at least one internal rotating screw which, during operation, forces the polymers along the length of the extruder barrel towards an outlet which is located near or at one end of the extruder barrel. A devolatilizing extruder further contains one or more vents located along the length of the extruder barrel, through which, in step (c), the vapor phase containing the separated volatile compound(s) but not the polymeric materials escape from the extruder barrel. A devolatilizing extruder further contains at least one inlet port, upstream of the outlet and upstream of at least one vent, for introducing the product obtained in step b) (or one or more components thereof) into the extruder barrel. "Upstream" refers to the direction opposite of that of the mass flow of polymeric materials through the extruder barrel; "downstream" refers to the direction of the mass flow of polymeric materials through the extruder barrel, i.e., in the direction of the outlet from which the devolatilized polymer blend is discharged.

In some embodiments, the devolatilizing extruder contains at least two inlet ports. In such embodiments, the brominated polymer solution can be introduced into the devolatilizing extruder through one of the inlet ports (optionally with a portion of the second thermoplastic polymer), and some or all of the second thermoplastic polymer can be introduced through another inlet port. In this case, step b) is at least partially performed in the devolatilizing extruder. In preferred embodiments the two inlet ports are separated by at least one back vent as described below. In such preferred embodiments, some or all of the second thermoplastic polymer is introduced through a first inlet port, which is upstream of the back vent(s). The brominated polymer solution (optionally with a portion of the second thermoplastic polymer) is introduced in a main inlet port downstream of the back vent(s). In such preferred embodiments, the second thermoplastic polymer can be melted upstream of the back vent(s) (or introduced as a melt) and formed into a melt seal upstream of the back vent(s).

The devolatilizing extruder preferably contains at least two forward vents downstream of the inlet port(s), and may contain three, or even more than three, such forward vents. The devolatilizing extruder may contain one or more vents that are upstream of the inlet port through which the brominated polymer solution (or combination thereof with some or all of the second thermoplastic polymer) is introduced into the extruder; such upstream vents are commonly referred to as "back vents", and these are typically located at or near the upstream end of the devolatilizing extruder. The vents (including any back vent(s)) provide a fluid path from the inside to the outside of the extruder barrel, through which in step c) the separate vapor phase containing the separated volatile compound(s) (but not the polymeric materials) escape from the extruder barrel. During operation, the pressure in the vents is lower than elsewhere in the extruder barrel; the pressure in the vent(s) may be super-atmospheric, atmospheric or sub-atmospheric but preferably is sub-atmospheric. The design of the vents is not considered to be critical; in some embodiments, the vents are simply openings in the extruder barrel through which gasses can escape. In more complex embodiments, the vents can include various types of valving and/or pressure control mechanisms (such as, for example, a vacuum pump), collection and recovery apparatus, means for preventing the polymeric materials from escaping through the vent(s) (such as a rotating screw situated within the vent), and the like. The vents may be in fluid communication with one or more condensers which condense some or all of the removed gasses to form liquids that can be recovered for disposal or re-use.

The devolatilizing extruder may further include one or more heating and/or cooling elements located along the length of the extruder barrel, to help control the temperature of the barrel contents as they traverse the extruder barrel to the outlet. The devolatilizing extruder may contain multiple (two or more) distinct heating and/or cooling zones, and may include, for example, a cooling zone located at or immediately upstream of the outlet.

The devolatilizing extruder also may include one or more inlets for introducing a stripping agent into the extruder barrel during step c). Such inlet(s) are generally located prior to the last (most downstream) of the vents, but they may be provided further upstream if desired (but downstream of the inlet port(s)). The inlets are in fluid communication with a source of a stripping agent. Auxiliary equipment, such as valves, pumps, metering devices, pressure sensors and the like may be provided to control the flow of the stripping agent into the extruder barrel.

The devolatilizing extruder may be, for example, a single-screw type, a tangential counter-rotating twin-screw extruder, a co-rotating twin screw extruder or, most preferably, a self-wiping co-rotating twin screw extruder.

The rotation of the extruder screw(s) provides mechanical force to move the non-volatile materials through the extruder barrel. The rotations of the screw(s) also constantly renew the surface of the polymer mixture, thereby facilitating the escape of volatile compounds. The extruder screw(s) generally include a number of elements arranged along its length. These elements can be selected from forwarding (or right-handed) screw elements, mixing elements such as kneading disc block elements, and other special mixing elements that can be used to enhance distributive mixing. During operation, the forwarding screw elements serve to drag or push the polymer mixture and resulting devolatilized polymer blend through the extruder barrel towards and through the outlet. The mixing elements such as kneading disc block elements are used for kneading and mixing.

The extruder screw(s) may additionally contain reversing elements or non-pumping barrier elements located at one or more points along its length. The reverse elements are sometimes referred to as "left-hand" elements while non-pumping barrier elements are sometimes called neutral kneading disc block elements or blister rings. Elements of these types produce localized forces on the polymer mixture in the upstream direction, i.e. in the direction opposite of the mass flow of polymeric materials through the extruder barrel. These elements in some cases provide mixing within the extruder barrel, and can serve to control the flow of materials through the barrel. It is often preferable to include one or more reverse screw or non-pumping barrier elements upstream of one or more of the vent(s) and preferably upstream of each vent; reverse screw or non-pumping barrier elements upstream of a vent can force the polymer mixture to fully fill the barrel upstream of the vent, forming a "melt seal" which prevents volatilized materials from traveling upstream through the barrel. In this way, gasses are forced downstream from the melt seal to the next downstream vent, from which they escape from the extruder barrel. The reverse screw or non-pumping barrier elements preferably are designed so that relatively low pressures are produced in the extruder barrel. Gauge pressures at the melt seal(s), for example, preferably are no greater than about 3 MPa and are more preferably no greater than about 1.0 MPa.

The screw elements located at or near the vent(s) may be forwarding type elements, which forward the polymeric material somewhat rapidly through the region of the vent, compared to immediately upstream of the vent where a melt seal may be formed. This allows the extruder barrel to become incompletely filled with polymeric material in the region at or near the vent, creating a "head space" proximate to the where the volatilized compounds can collect and enter the vent to escape from the extruder barrel. This allows the volatilized compounds to escape while minimizing the introduction of non-volatile materials (including the polymeric components) into the vent.

A preferred devolatilizing extruder contains, in order from the upstream end to the downstream end, at least one upstream inlet port through which some or all of the second thermoplastic polymer is introduced; at least one back vent; at least one main inlet port through which the brominated polymer solution or combination thereof with a portion of the second thermoplastic polymer is introduced, one or more forward vents, and an outlet through which the devolatilized polymer blend is removed from the devolatilizing extruder. Such a preferred devolatilizing extruder preferably also contains one or more inlets for introducing a stripping agent, located downstream of the inlet ports and upstream of at least the last of the vents. The screw of this preferred devolatilizing extruder preferably has one or more reverse elements and/or non-pumping elements between the upstream inlet port(s) and the back vent(s) such that, upon operation, second thermoplastic polymer introduced through the upstream inlet port(s) forms a melt seal upstream of the back vent(s). It has been found that producing such a melt seal permits low pressures (such as 0.04 MPa (40 kPa) actual or less, preferably 0.025 MPa (25 kPa) actual or less) to be obtained at the back vent(s). These low pressures facilitate the removal of solvent through the back vent, which can be quite important in reducing the volatile content of the devolatilized polymer blend to very low levels. In addition, the screw of this preferred devolatilizing extruder preferably also has one or more reverse elements and/or non-pumping elements downstream of the main inlet port and upstream of at least one of the forward vent(s), so that upon operation a melt seal is formed upstream of at least one of the forward vents. It is most preferred that melt seals are formed upstream of each back vent and each forward vent.

The temperature of the product from step b) (if formed upstream of the devolatilizing extruder) or of the brominated polymer solution and the second thermoplastic polymer (if step b) is performed within the devolatilizing extruder) at the time the materials are introduced into the devolatilizing extruder can range widely, but preferably does not exceed 230° C.

In some embodiments, step b) is performed in equipment upstream of the devolatilizing extruder and the product from that step is heat-plasticized at the time it is introduced into the devolatilizing extruder. By "heat-plasticized", it is meant simply that the material under consideration is in the form of a viscous fluid that flows through the extruder under the mechanical drag and pressure force applied by the extruder screw(s).

In other embodiments, step b) is performed in equipment upstream of the devolatilizing extruder and the resulting product is introduced into the devolatilizing extruder in the form of a solid or a dispersion or slurry. In such a case, the product is heated in the devolatilizing extruder to a temperature needed to heat-plasticize the polymeric materials and perform the devolatilization, as described below.

In still other embodiments, step b) is performed within the devolatilizing extruder by separately introducing at least a portion of the second thermoplastic polymer and the brominated polymer solution (or mixture with a portion of the second thermoplastic polymer into the devolatilizing extruder), where they are mixed. In these embodiments, the second thermoplastic polymer may be heat-plasticized at the time it is introduced, or may be introduced as a solid. Similarly, the brominated polymer solution (or mixture with a portion of the second thermoplastic polymer) may be added in the form of a heat-plasticized material, a slurry or dispersion, or as a solid. As before, if the materials are not heat-plasticized when introduced into the devolatilizing extruder, they are heated in the extruder to a temperature sufficient to heat plasticize the mixture.

If the product from step b) or the brominated polymer solution is at or above the boiling temperature of the volatile compound(s) when added to the devolatilizing extruder, they may be introduced into the devolatilizing extruder at a superatmospheric pressure to prevent premature escape of the volatile compounds.

If step b) is performed in the devolatilizing extruder, this step is performed in an upstream portion of the extruder, and the resulting combination then is transported to a more downstream portion of the extruder where the solvent is separated from the polymers.

During step c), the materials are brought to (if necessary) or maintained at a temperature above the boiling temperature (at atmospheric pressure) of the volatile compound(s). The temperature is also high enough to heat-plasticize the step b) product and resulting devolatilized polymer blend. The temperature in some embodiments is no greater than 100° C. of the glass transition temperature of the brominated polymer. Preferably, the temperature is from 10 to 100° C., preferably from 10 to 50° C., above the glass transition temperature of the brominated polymer. In especially preferred processes, the temperature of the polymeric materials during step c) is no greater than 230° C., more preferably no greater than 210° C. In some embodiments, this temperature is no greater than 200° C. or no greater than 180° C. The temperature may be as low as 175° C., as low as 150° C. or even as low as 125° C. in some embodiments, provided that the temperature is high enough to convert the volatile compound(s) to a gas and to maintain the polymeric materials in a heat-plasticized form until the devolatilized polymer blend is discharged from the outlet of the extruder.

The temperature of the materials in the devolatilizing extruder can be controlled via several operating parameters, including, for example, (1) the temperature of the raw materials fed into the extruder, (2) the application of heat or cooling to the barrel of the extruder and (3) the amount of mechanical energy supplied to operate the screw(s). In some embodiments, cooling can be applied to the extruder barrel or some portion thereof, to maintain the temperature within a needed range. Alternately, heating can be applied to the extruder barrel, if necessary to keep the polymeric materials heat-plasticized.

In addition, greater or smaller amounts of energy can be supplied to operate the screw in order to maintain the necessary temperatures inside the devolatilizing extruder.

Greater amounts of energy to the screw generally lead to higher screw rotational speeds, which are generally desirable because higher rotational speeds tend to lead to higher throughputs per unit time and to more efficient removal of the volatile compound(s). However, if too much energy is supplied to the screw(s), the viscous dissipation heating that occurs can lead to undesirable increases in the temperature of the contents of the extruder. The amount of energy supplied to the extruder can be expressed as a specific mechanical energy input (SEI), which is estimated from the power input calculation $$P_m = P_{max} \times \frac{RPM}{RPM_{max}} \times \frac{A}{A_{max}} = P_{max} \times \frac{RPM}{RPM_{max}} \times \text{Torque \%} \quad (I)$$

where $P_m$ represents the power input to the screw motor of the devolatilizing extruder, $P_{max}$ is the rated maximum motor power for the equipment, $RPM_{max}$ is the rated extruder maximum screw rotational speed for the equipment, $A_{max}$ is the rated maximum amperage for the equipment, RPM is the actual operating screw rotational speed and A is actual the operating amperage. Specific mechanical energy input (SEI) can be estimated using Equation (II) as below.

$$SEI\,(J/g) = \frac{3600\,(s/h) \times 0.9 \times P_m\,(kW)}{Q\,(kg/h)} \quad (II)$$

were Q is represents the mass per unit time of the polymer mixture fed into the devolatilizing extruder and $P_m$ is as defined in Equation I. In Equation II, the 0.9 factor represents an estimate of the fraction of the power $P_m$ that is transmitted to the screw(s), and reflects, for example, power losses within the motor and in the gearbox.

The SEI is suitably at least 150 Joules per gram of the polymer mixture (J/g), preferably at least 200 J/g and more preferably at least 250 J/g. The SEI preferably is no greater than 400 J/g and more preferably no more than 350 J/g. SEI values below about 150 J/g tend to result in slow screw rotational speeds, which results in low throughputs and/or inadequate removal of the volatiles. SEI values above about 400 J/g tend to lead to difficulties in maintaining the temperature of the contents of the extruder barrel within the desired ranges.

During step c), solvent(s) and other volatile compounds are formed into a separate vapor phase which is removed from the devolatilizing extruder through the vent or vents described before. In preferred embodiments at least some, preferably at least one-half, of the separate vapor phase is removed through one or more back vents as described before.

Actual pressures at the vents preferably are less than 100 kPa. Pressures at back vent(s) are more preferably 40 kPa or less and still more preferably 25 kPa or less. The actual pressure at least one forward vent preferably is 30 kPa or less; more preferably the actual pressure at least one forward vent is 10 kPa or less and still more preferably 5 kPa or less. In some embodiments, the actual pressure at the first forward vent is from 10 to 100 kPa, and the actual pressure at at least one subsequent (further downstream) forward vent is 10 kPa or less, especially 5 kPa or less.

A stripping agent may be introduced into the barrel of the devolatilizing extruder during the step c). The stripping agent is a material that is in a gaseous or supercritical state under the conditions that exist proximate to the vent(s) that are downstream of the point(s) at which the stripping agent are introduced. The stripping agent is typically introduced in the form of a gas, a supercritical fluid, or as a liquid. The stripping agent should have low solubility in the brominated polymer and the second thermoplastic polymer. Water is an especially useful stripping agent, although gasses such as air, nitrogen, argon, carbon dioxide and the like are also useful. The amount of stripping agent is typically small, relative to the weight of the polymers; a useful amount is from about 0.1 to about 5, preferably from about 0.25 to about 2.5 parts by weight per 100 parts by weight of the product formed in step b). The stripping agent is removed along with other volatile compounds at vent(s) located downstream of the point(s) of introduction.

The presence of the stripping agent often helps to maintain the contents of the extruder barrel at lower temperatures (compared to an otherwise like case in which no stripping agent is added), due to reduced viscous dissipation heating. The use of the stripping agent is preferred for that reason. The use of a stripping agent also favors a more complete removal of solvent and other volatile compounds.

The devolatilized polymer blend is discharged through the extruder outlet. The extruder outlet is downstream of the last of the vent(s); typically the outlet is a die that is located at a terminus of the extruder barrel. Such a die produces an extrudate that can have any useful cross-section. One useful type of die produces an extrudate having a cross-sectional area of from 0.1 to 6 cm$^2$, preferably from 0.25 to 2 cm$^2$. The extrudate can be cooled by immersion into a liquid bath or by other useful means to solidify the material. The solidified extrudate may be chopped into granules that are useful for subsequent melt-processing operations.

The term "devolatilized polymer blend" refers to the devolatilized mixture of polymers that is produced in the devolatilizing extruder when the solvent(s) and other volatilize materials are separated from during step c). The devolatilized polymer blend contains the brominated organic polymer, the second thermoplastic polymer(s), plus any other materials which are introduced into the devolatilizing extruder and which are not removed through the vent(s). The devolatilized polymer blend contains no more than 3,000 ppm of volatile compounds. It preferably contains no more than 2,000 ppm of volatile compounds and more preferably no more than 1,000 ppm thereof.

In preferred embodiments, the devolatilized polymer blend is further characterized in having a melt shear viscosity of no greater than 500 Pa-s at a shear rate of 100 s$^{-1}$ and of no greater than 300 Pa-s at a shear rate of 1000 s$^{-1}$ at 180° C. The polymer blend more preferably has a melt shear viscosity of no greater than 200 Pa-s at a shear rate of 100 s$^{-1}$ and of no greater than 100 Pa-s at a shear rate of 1000 s$^{-1}$ at 180° C. This melt shear viscosity is mainly determined by the specific brominated organic polymer and second thermoplastic polymer(s) that are selected, in addition to other materials as may be present, and of course by the ratios of those components. Any volatile compounds that remain in the devolatilized polymer blend tend to have negligible effect on the melt viscosity, due to the small amounts that are present.

The devolatilized polymer blend obtained from step c) may contain various optional components, in addition to the brominated organic polymer, second thermoplastic polymer(s) and solvent(s) as already described. These may include, for example, various screw lubricants (such as barium stearate or zinc stearate), antioxidants, acid scavengers, slip additives, UV stabilizers, pigments or other colorants, nucleating agents, plasticizers, FR agents, FR synergists, IR blockers, inorganic fillers such as TiO$_2$, talc, graphite, carbon black, aluminum flake, and layered silicates and the like. The additives may be provided because they are useful in some downstream melt-processing process, such as those described below. An advantage of incorporating such additives during the process of the invention is that a subsequent compounding step can be eliminated or simplified. These materials may be added at any convenient point in the process of this invention including, for example, during the bromination reaction, during the combination step b), during step c), or between any of those steps. Some or all of these materials may be previously incorporated into the second thermoplastic polymer before it is combined with the brominated polymer solution in step b).

A preferred type of optional component is one or more thermal stabilizers. Thermal stabilizers are materials which, when in admixture with the brominated organic polymer, increase its resistance to thermal degradation. These may operate via various mechanisms, such as by scavenging free radicals, acting as antioxidants, blocking degradation pathways, and the like; the particular mechanism(s) by which the thermal stabilizers operate are not considered to be critical to the invention. The thermal stabilizer(s) may constitute up to 20 percent of the weight of the devolatilized polymer blend. A preferred amount is from 1 to 20 percent, and more preferred amount is from 5 to 20 percent. The thermal stabilizers should not be volatile compounds, as defined before, and so will remain in the polymer blend after volatile compounds are separated during step c).

Preferred stabilizers, especially when the brominated organic polymer contains aliphatically bound halogen, include alkyl phosphites and epoxy compounds. Alkyl phosphites and epoxy compounds may be used in combination.

Suitable alkyl phosphites are described in "Plastic Additive Handbook", edited by H. Zweifel, 5$^{th}$ Ed., p. 441 (2001). The alkyl phosphite compound contains at least one

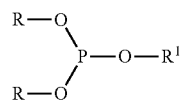

group, in which each R group is an unsubstituted or substituted alkyl group. The two R groups together may form a divalent group, which may be substituted, that bonds to the adjacent —O— atoms through an aliphatic carbon to form a ring structure that includes the —O— P—O— linkage. The R groups may be linear or branched. The carbon atom on the R groups that is adjacent to and bonded to the —O— atom is preferably a methylene (—CH$_2$—) carbon. Substituent groups on the R groups may be, for example, aryl, cycloalkyl,

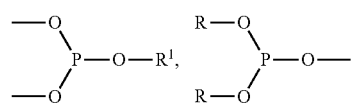

or an inert substituent. The R$^1$ group in the foregoing structures may be another R group, or an aryl or substituted aryl group.

A preferred type of R$^1$ group is an aryl group that is substituted with at least one branched alkyl group that contains a tertiary carbon atom. The branched alkyl group that contains a tertiary carbon atom may be further substituted with one or more aryl groups. Another preferred type of R$^1$ group is an alkyl group, which may be branched or linear, having from 2 to 30, preferably from 8 to 20, carbon atoms. Examples of suitable R$^1$ groups include dodecyl, tetradecyl, hexadecyl, octadecyl, 2,4-di-(t-butyl)-phenyl,

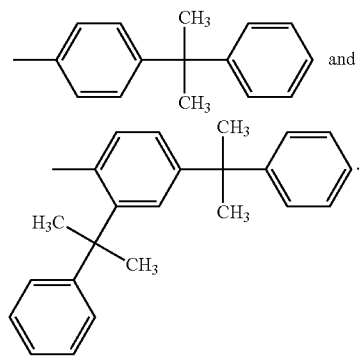

A preferred alkyl phosphite is a pentaerythritol diphosphite compound. These materials have the structure

wherein R$^2$ is an unsubstituted or substituted, linear or branched, alkyl group, an aryl group or a substituted aryl group.

Specific examples of preferred alkyl phosphites include bis(2,4-dicumylphenyl)pentaerythritol diphosphite, distearylpentaerythritol diphosphite and di(2,4-di-(t-butyl)phenyl)pentaerythritol diphosphite. These are commercially available as Doverphos™ S-9228 (Dover Chemical Corporation), Doverphos™ S-682 (Dover Chemical Corporation) and Irgafos™ 126 (Ciba Specialty Chemicals).

Epoxy compounds that are useful as a thermal stabilizer contain on average at least one and preferably two or more epoxide groups per molecule. The epoxy compound preferably has an equivalent weight per epoxide group of no more than 2000, preferably no more than 1000 and even more preferably no more than 500. The molecular weight of the epoxy compound is at least 1000 in preferred embodiments. The epoxy compound may be brominated. A variety of commercially available epoxy resins are suitable. These may be based, for example, on a bisphenol compound, such as various diglycidyl ethers of bisphenol A. They may be based on a brominated bisphenol compound. The epoxy compound may be an epoxy novolac resin, or an epoxy cresol novolac resin. The epoxy compound may be an entirely aliphatic material, such as a diglycidyl ether of a polyether diol or an epoxidized vegetable oil. Examples of commercially available epoxy compounds that are useful herein include F2200HM and F2001 (from ICL Industrial Products), DEN 439 (from The Dow Chemical Company), Araldite ECN-1273 and ECN-1280 (from Huntsman Advanced Materials Americas, Inc.), and Plaschek 775 (from Ferro Chemical Co.).

Other thermal stabilizers can be used, by themselves or in addition to the alkyl phosphite and/or the epoxy compound. Examples of such materials include, for example, inorganic materials such as tetrasodium pyrophosphate, hydrocalumite, hydrotalcite and hydrotalcite-like clays; polyhydroxyl compounds having a molecular weight of 1000 or below, such as pentaerythritol, dipentaerythritol, glycerol, xylitol, sorbitol or mannitol, or partial esters thereof; and organotin stabilizers which may be allylophilic and/or dieneophilic. The organotin compounds include, for example, alkyl tin thioglycolates, alkyl tin mercaptopropionates, alkyl tin mercaptides, alkyl tin maleates and alkyl tin (alkylmaleates), wherein the alkyls are selected from methyl, butyl and octyl. Suitable organotin compounds are available commercially from Ferro Corporation (i.e., Thermchek™ 832, Thermchek™ 835), and Baerlocher GmbH (i.e., Baerostab™ OM 36, Baerostab™ M25, Baerostab™ MSO, Baerostab™ M63, Baerostab™ OM 710S).

A preferred thermal stabilizer is a combination of a) an alkyl phosphite and b) an epoxidized vegetable oil, optionally further containing c) an epoxy cresol novolac resin.

The thermal stabilizer(s) may in some cases function as lubricants or plasticizers, reducing the shear viscosity of the devolatilized polymer blend and in that manner further reducing frictional heat generation during step c). This effect is especially seen when certain epoxides such as epoxidized vegetable oils are present.

The devolatilized polymer blend recovered from the process is useful as a flame retarding agent for a variety of organic polymers which, for purposes of this invention, are referred to as a "bulk polymer". In such flame retardant applications, the devolatilized polymer blend is combined with the bulk polymer and fabricated into some useful article. The fabrication step is typically performed in a melt-processing operation, in which the bulk polymer and the devolatilized polymer blend obtained from this invention are melted and formed. Melt processing, for purposes of this invention, involves heat-plasticizing the bulk polymer and the polymer blend obtained from the devolatilizing extrusion step, forming the heat-plasticized material, and then cooling the heat-plasticized material to solidify it and produce an article. Various melt processing operations, such as extrusion, injection molding, compression molding, casting, and the like can be used as desirable in any specific case. The melt processing operations of most interest are extrusion foaming and the formation of expandable polymer beads.

It is preferred to combine enough of the devolatilized polymer blend with the bulk polymer to provide the resulting material with a bromine content within a range of from 0.1 percent by weight to 25 percent by weight, based upon blend weight. A preferred bromine concentration in the blend (provided by the devolatilized polymer blend) is from 0.25 to 10 percent by weight, a more preferred amount is from 0.5 to 5 weight percent, and a still more preferred amount is from 1 to 3 weight percent. The amount of devolatilized polymer blend that is needed to provide a given bromine content to the blend will of course depend on its bromine content. In general, however, as little as about 0.25 parts by weight of the devolatilized polymer blend can be provided per 100 parts by weight bulk resin (pphr). At least 0.5 pphr or at least 1.2 pphr of the devolatilized polymer blend can be provided. Up to 200 pphr of the devolatilized polymer blend can be used, but a preferred maximum amount is 100 pphr, a more preferred maximum amount is 40 pphr and a still more preferred maximum amount is 20 pphr or even 15 pphr.

The bulk polymer should be thermoplastic for use in a melt processing operation. It should have a weight average molecular weight of greater than 100,000, preferably greater than 175,000 and more preferably at least 200,000 (as measured by GPC against a polystyrene standard), and have a melting or softening temperature of at least 100° C. to about 325° C. Thermoplastic polymers of interest as the bulk polymer include vinyl aromatic polymers (including vinyl aromatic homopolymers, vinyl aromatic copolymers, or blends of one or more vinyl aromatic homopolymers and/or vinyl aromatic copolymers), as well as other organic polymers in which the devolatilized polymer blend is soluble or can be dispersed to form domains of predominantly less than 25 µm, preferably less than 10 µm, in size. Polymers and copolymers of styrene are preferred. Most preferred are polystyrene homopolymers, and copolymers of styrene with ethylene, propylene, acrylic acid, maleic anhydride, and/or acrylonitrile. Polystyrene homopolymer is most preferred. Blends of any two or more of the foregoing polymers, or of one or more of the foregoing polymers with another resin, also can be used as the bulk polymer.

In an especially preferred case, the devolatilized polymer blend contains a) a brominated block copolymer of a conjugated diene and a vinyl aromatic polymer, especially a brominated butadiene-styrene block copolymer, and b) as the second thermoplastic polymer, a polymer of a vinyl aromatic monomer such as styrene. The bulk polymer in such an especially preferred case is a polymer of at least one vinyl aromatic monomer, such as styrene.

A melt processing operation can include other additives, such as, for example, lubricants such as barium stearate or zinc stearate; UV stabilizers, pigments, nucleating agents, plasticizers, FR synergists, IR blockers, and the like.

Extrusion foaming is performed by forming a pressurized melt that contains the bulk polymer, the devolatilized polymer blend, a blowing agent, other additives such as may be useful. Many of these additives, other than the blowing agent, can be incorporated into the devolatilized polymer blend during the inventive process, as described before, and so may not need to be added during the extrusion foaming process, thereby simplifying the extrusion foaming operation. Once the raw materials have been mixed and the polymers melted, the resulting gel is forced through an opening into a zone of lower pressure, where the blowing agent expands and the polymer solidifies to form a foam. The extruded foam can take the form of a sheet (having a thickness of up to ½ inch (12 mm)), plank or boardstock (having a thickness of from ½ inch (12 mm) to 12 inches (30 cm) or more), or other convenient shape. The material can be extruded to form coalesced strand foam if desired.

The blowing agent in an extrusion foaming process can be an exothermic (chemical) type or an endothermic (physical) type. Physical blowing agents such as carbon dioxide, various hydrocarbons, hydrofluorocarbons, water, alcohols, ethers and hydrochlorofluorocarbons are especially suitable.

Boardstock foams made in accordance in such a foaming extrusion process are useful as building foam insulation, as part of roof or wall assemblies. Other foams made in accordance with the invention can be used as decorative billet, pipe insulation and in molded concrete foundation applications.

A devolatilized polymer blend made in accordance with the invention is also useful as a flame retardant for expanded bead foams. Such foams can be prepared, for example, by dissolving the devolatilized polymer blend into a monomer or monomers, suspension polymerizing the monomer(s) to form polymer beads, infusing the polymer beads with a blowing agent to form expandable polymer beads, and then thermally expanding the expandable polymer beads to form a foamed article. Another method of preparing expandable polymer beads is to heat plasticize the devolatilized polymer blend and a bulk polymer, and combine the heat-plasticized materials with a liquid or supercritical blowing agent under temperature and pressure conditions at which the blowing agent does not volatilize and expand. The resulting polymer/blowing agent mixture is then cooled to kinetically entrap the blowing agent. This mixing process is conveniently performed in an extruder, which can be operated if desired immediately downstream from the devolatilizing extrusion step described herein. The mixture is cooled such that the extrudate exiting the extruder does not expand. The extrudate conveniently passes through a die which forms it into small cross-section profiles, which after extrusion and cooling are chopped into beads or pellets. Such an extrusion process for making expandable beads is described, for example, in EP 0668139 B1. The expandable bead so obtained can be thermally expanded in known fashion to make foamed articles.

The following examples are provided to illustrate the invention, but not to limit the scope thereof. All parts and percentages are by weight unless otherwise indicated.

EXAMPLE 1

A brominated polymer solution is prepared by dissolving 22.5 parts of a brominated styrene-butadiene polymer in 50 parts of dibromomethane. This solution simulates a borminated polymer solution obtained from the bromination of a starting styrene-butadiene polymer. This solution is processed through a tandem devolatilization extrusion line to first blend it with a second thermoplastic polymer and a thermal stabilization package, and then to devolatilize the resulting blend. The line consists of a TEX-65α twin-screw extruder, which has a length:diameter ratio of 49, and which feeds a TEX-30α twin-screw devolatilizing extruder. The first extruder is used to combine the brominated polymer solution with 20 parts of the second thermoplastic polymer and 7.5 parts of a stabilization package. The second thermoplastic polymer is a polystyrene having an $M_w$ of approximately 140,000, marked by Styron LLC as PS 640 resin. The stabilization package consists of an epoxy cresol novolac resin (3.75 parts), an epoxidized soybean oil (1.88 parts) and an alkyl phosphite marketed as Doverphos 5-9228 by Dover Chemical Corporation (1.88 parts). The materials achieve a temperature of about 145° C. in the first extruder, and are discharged under pressure into the devolatilizing extruder at that temperature.

The devolatilizing extruder has a length/diameter ratio of 56. The extruder has, in order, an upstream inlet port, a back vent, a main inlet port, and four forward vents. Each of the vents is connected to a vacuum pump which operates to maintain a predetermined pressure at the respective vents as follows: back vent: 15 kPa actual; first forward vent, 15 kPa actual; second, third and fourth forward vents: 3 kPa actual. The devolatilizing extruder also has injection ports located before the second, third and fourth injection ports. The screws are designed to produce melt seals between the upstream inlet port and the back vent and upstream of each forward vent.

The polymer mixture from the first extruder is introduced into the devolatilizing extruder through the main inlet at the rate of 55 kg/hr. More of the second thermoplastic polymer is introduced into the first feed inlet at the rate of 2 kg/hr; this polymer forms a melt seal upstream of the back vent. Water is injected through each of the injection ports at the rate of 0.64, 0.54 and 0.64 kg/h, respectively. The screw speed is 350 rpm. The specific energy input is 420 J/g based on the weight of starting materials, and 841 J/g based on the weight of the devolatilized polymer blend. The melt discharge temperature is 136° C.

The devolatilized polymer blend contains less than 200 ppm residual solvent. It contains 25% by weight bromine. It has a 5% weight loss temperature of 270° C. The number average molecular weight is 46,200, the weight average molecular weight is 120,000 and the polydispersity is 2.60. The process therefore provides a simple and economic method for reducing the volatiles content of a brominated polymer reaction solution to very low levels, while producing a devolatilized polymer that has excellent thermal stability.

EXAMPLES 2-5

Examples 2-5 are performed in the same general manner as described in Example 1, with modifications in vent pressures and water injection rates as indicated in Table 1 below. Results (residual solvent, bromine content, 5% weight loss temperature, and molecular weight information) are as indicated in Table 1.

TABLE 1

| Parameter/property | Example 2 | Example 3 | Example 4 | Example 5 |
|---|---|---|---|---|
| Backvent pressure, mPa | 91 | 21 | 21 | 21 |
| Pressure, 1$^{st}$ forward vent, kPa actual | 15 | 15 | 15 | 15 |
| Pressure, 2$^{nd}$ and 3$^{rd}$ forward vent, kPa actual | 3 | 3 | 3 | 3 |
| Pressure, 4$^{th}$ forward vent, kPa actual | 3 | 0 | 3 | 3 |
| Water injection rate, first port, kg/hr | 0.63 | 0.63 | 0.30 | 0 |
| Water injection rate, second port, kg/hr | 0.55 | 0.52 | 0.31 | 0.0 |
| Water injection rate, third port, kg/hr | 0.64 | 0 | 0.31 | 0 |
| Discharge temperature, ° C. | 136 | 136 | 137 | 137 |
| Specific energy input (starting materials), J/g | 377 | 409 | 403 | 399 |
| Specific energy input (product), J/g | 754 | 818 | 806 | 798 |
| 5% weight loss temperature | 270 | 270 | 270 | 270 |
| Residual solvent, ppm | <200 | <200 | <200 | 351 |
| Bromine content, % | 28 | 25 | 26 | 26 |
| Mn, g/mol | 50,000 | 45,100 | 45,500 | 50,000 |
| Mw, g/mol | 117,000 | 122,000 | 122,000 | 122,000 |
| Polydispersity | 2.34 | 2.71 | 2.68 | 2.44 |

Examples 2-5 demonstrate that devolatilized polymer blends having very low levels of volatile compounds can be produced using a range of devolatilization conditions. Example 5 demonstrates that low volatile contents can be obtained even without the stripping gas, although the volatile content in that example is higher than in Examples 1-4.

What is claimed is:

1. A process for producing and devolatilizing a brominated polymer, comprising
   a) brominating a starting organic polymer by reaction of the organic polymer with a brominating agent in solution to produce a brominated polymer solution that contains at least 65% by weight volatile compounds and not more than 35% by weight of the brominated organic polymer;
   b) combining the brominated polymer solution with at least one additional thermoplastic organic polymer to reduce the concentration of volatile compounds in the solution to at most 60% by weight, wherein the additional thermoplastic organic polymer is substantially devoid of polymerizable carbon-carbon unsaturation and contains less than 5% by weight of halogen, and
   c) separating the product obtained in step b) in a devolatilizing extruder to form a devolatilized polymer blend containing the brominated organic polymer, the additional thermoplastic organic polymer, and not more than 3,000 ppm of volatile compounds, and a separate vapor phase containing separated volatile compounds and discharging the vapor phase through at least one vent in the devolatilizing extruder barrel and discharging the devolatilized polymer blend from the devolatilizing extruder through an outlet downstream of the vent(s).

2. The process of claim 1, wherein the brominated polymer solution contains from 5 to 25% by weight of the brominated polymer.

3. The process of claim 1, wherein a portion of the additional thermoplastic organic polymer is combined with the brominated polymer solution in the devolatilizing extruder.

4. The process of claim 1, wherein the devolatilizing extruder includes at least one back vent.

5. The process of claim 4, wherein (i) the devolatilizing extruder includes a main inlet port through which the brominated polymer solution or combination thereof with some or all of the additional thermoplastic polymer is introduced into the devolatilizing extruder; (ii) the back vent is upstream of the main inlet port, and (iii) the devolatilizing extruder further includes a first inlet port upstream of the back vent, and at least a portion of the additional thermoplastic polymer is introduced into the devolatilizing extruder through the first inlet port.

6. The process of claim 5, wherein the additional thermoplastic polymer introduced into the devolatilizing extruder through the first inlet port is formed into a melt seal upstream of the back vent(s).

7. The process of claim 1 wherein the devolatilizing extruder contains, in order from an upstream end to a downstream end, at least one upstream inlet port through which some or all of the additional thermoplastic polymer is introduced; at least one back vent; at least one main inlet port through which the brominated polymer solution or combination thereof with a portion of the additional thermoplastic polymer is introduced, one or more forward vents, an outlet through which the devolatilized polymer blend is removed from the devolatilizing extruder and a screw having one or more reverse elements and/or non-pumping elements between the upstream inlet port(s) and the back vent(s) such that, upon operation, additional thermoplastic polymer introduced through the upstream inlet port(s) forms a melt seal upstream of the back vent(s).

8. The process of claim 7 wherein the screw also has one or more reverse elements and/or non-pumping elements downstream of the main inlet port and upstream of at least one of the forward vent(s), so that upon operation a melt seal is formed upstream of at least one of the forward vents.

9. The process of claim 1, wherein the brominated polymer is a brominated polymer of butadiene and a vinyl aromatic polymer.

10. The process of claim 9, wherein the brominated polymer is a block copolymer of butadiene and styrene.

11. The process of claim 9, wherein the brominated polymer contains from 25 to 75% by weight bromine.

12. The process of claim 1, wherein the additional thermoplastic polymer has a molecular weight of 25,000 to 150,000, as measured by GPC against a polystyrene standard.

13. The process of claim 12, wherein the additional thermoplastic polymer(s) has a melt shear viscosity as a neat resin of less than 200 Pa·s at a shear rate of $100$ $s^{-1}$ and a melt shear viscosity as a neat resin of less than 100 Pa·s at a shear rate of $1000$ $s^{-1}$ at 180° C.

14. The process of claim 13, wherein the additional thermoplastic polymer is a polymer or copolymer of a vinyl aromatic monomer.

15. The process of claim 14, wherein the additional thermoplastic polymer is polystyrene.

16. The process of claim 1 wherein the devolatilized polymer blend further contains at least one additive selected from screw lubricants, antioxidants, acid scavengers, slip additives, UV stabilizers, colorants, nucleating agents, plasticizers, flame retardants, flame retardant synergists, infrared blockers and inorganic fillers.

17. The process of claim 16 wherein at least one additive is combined with the brominated polymer solution prior to step b).

18. The process of claim 16 wherein at least one additive is combined with the brominated polymer solution during step b).

19. The process of claim 16 wherein at least one additive is combined with the brominated polymer solution in the devolatilizing extruder.

* * * * *